US010298068B2

United States Patent
Oh et al.

(10) Patent No.: US 10,298,068 B2
(45) Date of Patent: May 21, 2019

(54) POWER WIRELESS TRANSMITTER IN MAGNETIC RESONANCE-BASED WIRELESS POWER TRANSMISSION SYSTEM

(71) Applicant: Power Republic Corp., Seoul (KR)

(72) Inventors: Yeonmi Oh, Anyang-si (KR); Changuk Choi, Suwon-si (KR)

(73) Assignee: POWER REPUBLIC CORP., Seoul (KR)

( * ) Notice: Subject to any disclaimer, the term of this patent is extended or adjusted under 35 U.S.C. 154(b) by 228 days.

(21) Appl. No.: 15/307,451

(22) PCT Filed: Jul. 14, 2016

(86) PCT No.: PCT/KR2016/007700
§ 371 (c)(1),
(2) Date: Oct. 28, 2016

(87) PCT Pub. No.: WO2017/022972
PCT Pub. Date: Feb. 9, 2017

(65) Prior Publication Data
US 2017/0229914 A1    Aug. 10, 2017

(30) Foreign Application Priority Data

Jul. 31, 2015   (KR) .................. 10-2015-0108741

(51) Int. Cl.
*H02J 50/12*  (2016.01)
*H02J 50/60*  (2016.01)
*H02J 50/90*  (2016.01)

(52) U.S. Cl.
CPC ............. *H02J 50/12* (2016.02); *H02J 50/60* (2016.02); *H02J 50/90* (2016.02)

(58) Field of Classification Search
CPC .................. H02J 50/12; H02J 50/60
See application file for complete search history.

(56) References Cited

U.S. PATENT DOCUMENTS

| 7,761,067 | B1* | 7/2010 | Tsai | H03H 7/12 |
| | | | | 455/114.2 |
| 2010/0001847 | A1 | 1/2010 | Takaishi et al. | |
| 2010/0084918 | A1* | 4/2010 | Fells | H02J 5/005 |
| | | | | 307/32 |
| 2010/0217553 | A1* | 8/2010 | Von Novak | G06K 7/0008 |
| | | | | 702/65 |

(Continued)

FOREIGN PATENT DOCUMENTS

| JP | H01-206853 A | 8/1989 |
| JP | 2010-103200 A | 5/2010 |

(Continued)

*Primary Examiner* — Jeffrey M Shin
(74) *Attorney, Agent, or Firm* — Korus Patent, LLC; Seong Il Jeong

(57) ABSTRACT

The present disclosure is to provide a power wireless transmitter in a magnetic resonance-based wireless power transmission system, wherein when, due to a presence of a metal, an output from the wireless power transmitter has a change in a resonance frequency thereof, a drive frequency and/or duty ratio with a maximum output therefrom are determined to be applied for a transmission from the wireless power transmitter, thereby to achieve an efficient wireless power transmission.

6 Claims, 2 Drawing Sheets

(56) References Cited

U.S. PATENT DOCUMENTS

| | | | | |
|---|---|---|---|---|
| 2011/0298419 | A1* | 12/2011 | Tsai | H01M 10/46 |
| | | | | 320/108 |
| 2012/0300872 | A1* | 11/2012 | Kim | H04L 27/02 |
| | | | | 375/295 |
| 2013/0033118 | A1 | 2/2013 | Karalis et al. | |
| 2015/0349542 | A1* | 12/2015 | Yamamoto | G01V 3/10 |
| | | | | 307/104 |

FOREIGN PATENT DOCUMENTS

| | | |
|---|---|---|
| JP | 2014-171371 A | 9/2014 |
| JP | 2014-204630 A | 10/2014 |
| JP | 2015-061357 A | 3/2015 |
| KR | 10-2013-0005571 A | 1/2013 |
| KR | 10-2014-0049668 A | 4/2014 |
| KR | 10-2014-0053282 A | 5/2014 |
| WO | 2009/081115 A1 | 7/2009 |
| WO | 2014/068989 A1 | 5/2014 |

* cited by examiner

POWER WIRELESS TRANSMITTER IN MAGNETIC RESONANCE-BASED WIRELESS POWER TRANSMISSION SYSTEM

CROSS-REFERENCE TO RELATED APPLICATION

This application claims the benefit of Korea patent application No. 10-2015-0108741, filed on Jul. 31, 2015, the entire content of which is incorporated herein by reference for all purposes as if fully set forth herein.

BACKGROUND

Field of the Present Disclosure

The present disclosure relates to a power wireless transmitter in a magnetic resonance-based wireless power transmission system, and, in particularly, to a power wireless transmitter in a magnetic resonance-based wireless power transmission system, wherein when, due to a presence of a metal, an output from the wireless power transmitter has a change in a resonance frequency thereof, a drive frequency and/or duty ratio with a maximum output therefrom are determined to be applied for a transmission from the wireless power transmitter, thereby to achieve an efficient wireless power transmission.

Discussion of Related Art

Generally, a magnetic resonance-based wireless power transmission system may transmit a non-radiant electronic wave energy between two resonators using resonance. When a resonance frequency of a transmitter coincides with that of a receiver, an efficient wireless power transmission may occur.

However, a resonance frequency of a transmitter does not coincide with that of a receiver, an efficient wireless power transmission may not be achieved. This is true of a situation where a metal is disposed between the transmitter and receiver due to a change in a resonance frequency.

Further, when a metal is adjacent to the wireless power transmitter, the inductance of the wireless power transmitter may change. Thus, in order to keep the resonance frequency constant, the capacitance of the wireless power transmitter may be adjusted. However, this approach may have a limitation in terms of times of the changes of the capacitance of the wireless power transmitter.

In this connection, Korean patent No. 10-1386650 discloses a method for detecting a foreign material by a wireless power transmission device in a wireless power transmission system using the magnetic resonance induction manner, as shown in FIG. 1. In this approach, when a foreign material is detected in a wireless power transmission system, it is determined whether the foreign material is a device being charged or not by transmitting a joining request signal. The method for detecting a foreign material by a wireless power transmission device in a wireless power transmission system using the magnetic resonance induction manner comprises the steps of detecting a foreign material by detecting at least one change of a current, a voltage and a phase; transmitting a joining request signal according to a magnetic field communication protocol; detecting a joining response signal which responds to the joining request signal; and informing a user of the presence of the foreign material unless receiving the joining response signal.

However, in this prior-art approach, when the foreign material is detected in a wireless power transmission system, the user should remove the foreign material manually. Otherwise, the wireless power transmission efficiency may be deteriorated.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is to provide a power wireless transmitter in a magnetic resonance-based wireless power transmission system, wherein when, due to a presence of a metal, an output from the wireless power transmitter has a change in a resonance frequency thereof, a drive frequency and/or duty ratio with a maximum output therefrom are determined to be applied for a transmission from the wireless power transmitter, thereby to achieve an efficient wireless power transmission.

In one aspect of the present disclosure, there is provided a power wireless transmitter in a magnetic resonance-based wireless power transmission system, the transmitter comprising: a power supply; a variable drive frequency signal generator configured to receive a drive voltage from the power supply and generate a drive frequency signal for wireless power transmission; a switching unit configured to receive the drive voltage from the power supply and to receive the variable drive frequency signal from the variable drive frequency generator and to switch and amplify the variable drive frequency signal; a wireless power transmission unit configured to receive the variable drive frequency signal from the switching unit and wirelessly transmit a power to a wireless power receiving unit using the variable drive frequency signal; a frequency detection unit configured to detect an amplitude of the variable drive frequency signal outputted from the wireless power transmission unit; and a comparator configured to compare the detected amplitude of the variable drive frequency signal to a reference value as a predetermined amplitude, when the detected amplitude of the variable drive frequency signal is larger than or equal to the reference value as a predetermined amplitude, the frequency of the variable drive frequency signal is determined as a drive frequency for transmission from the wireless power transmission unit, wherein the determined frequency is fed back to the variable drive frequency generator, and, thus, the variable drive frequency generator generates a drive frequency signal using the fed drive frequency.

In one implementation, the variable drive frequency generator generates the variable drive frequency signal by varying a drive frequency at a first sweep frequency interval within ±50% of a resonance frequency determined by an inductance and capacitance of an inductor and capacitor included in the wireless power transmission unit.

In one implementation, when the detected amplitude of the variable drive frequency signal is smaller than the reference value as a predetermined amplitude, the variable drive frequency generator generates a drive frequency signal by varying the drive frequency at a second sweep frequency interval smaller than the first sweep frequency interval.

In one implementation, the power wireless transmitter further comprises a duty ratio changing unit configured to vary a duty ratio of the drive frequency signal generated from the variable drive frequency generator, wherein the drive frequency signal with a varied duty ratio is inputted to the switching unit.

In one implementation, a duty reference value is set to 50%, and the duty ratio changing unit is configured to vary the duty ratio within ±10% of the duty reference value.

In one implementation, the switching unit is implemented using a half bridge or full bridge circuit.

In one implementation, the wireless power transmission unit wirelessly transmits the power to the wireless power receiving unit via a LC parallel resonance.

In one implementation, the frequency detection unit uses an envelope detection, LC ratio detection, Foster-seeley detection, or voltage comparison detection.

In one implementation, when the detected amplitude of the variable drive frequency signal with the varied duty ratio is larger than or equal to the reference value as the predetermined amplitude, the varied duty ratio is determined as a duty ratio for transmission from the wireless power transmission unit, wherein the determined duty ratio is fed back to the duty ratio changing unit, and, thus, the duty ratio changing unit varies a duty ratio of the drive frequency signal using the fed duty ratio.

In one implementation, plural variable drive frequency signals with different drive frequencies and duty ratios have amplitudes equal to or larger than the predetermined amplitude as the reference value, the drive frequency and duty ratio for transmission from the wireless power transmission unit are determined as a drive frequency and duty ratio of an variable drive frequency signal with the largest amplitude among the plural variable drive frequency signals.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTIONS

Figure 1:
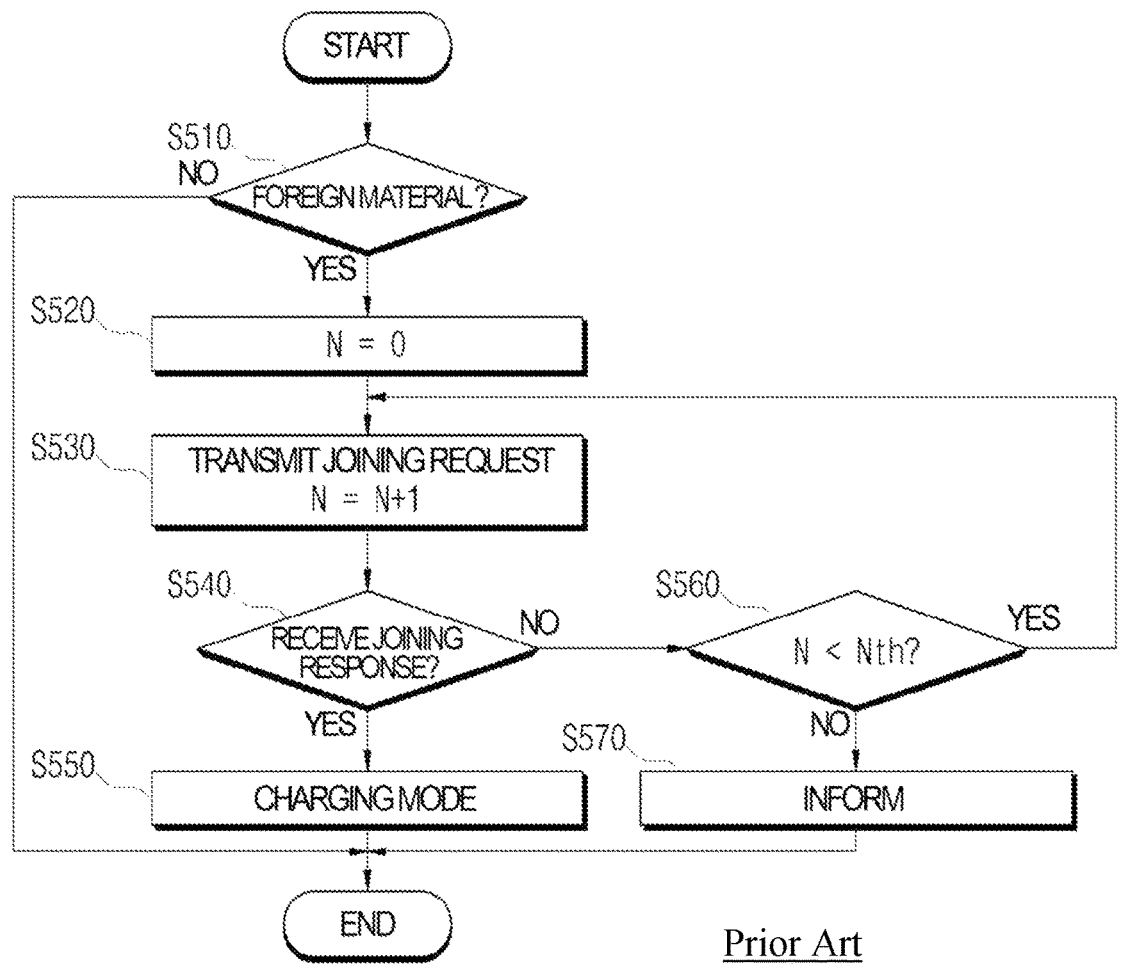
FIG. 1 illustrates a flow chart of a method for detecting a foreign material by a wireless power transmission device in a wireless power transmission system using the magnetic resonance induction manner in accordance with a prior art.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims. Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

Figure 2:
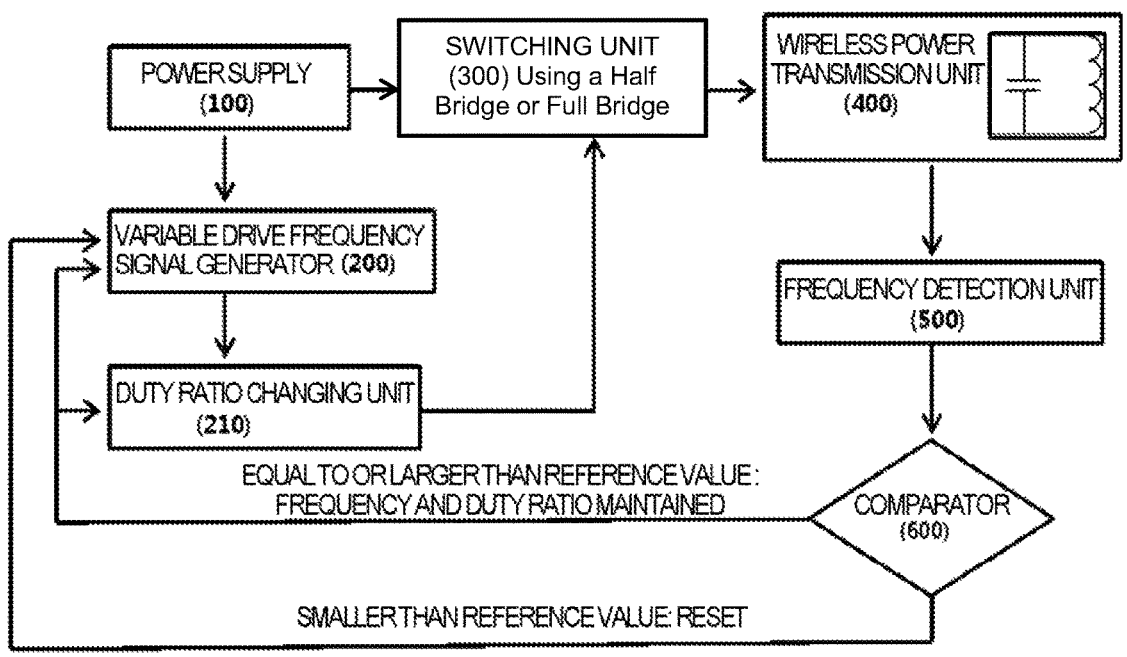
FIG. 2 is a block diagram of a transmitter of a magnetic resonance-based wireless power transmission system in accordance with the present disclosure.

FIG. 2 is a block diagram of a transmitter of a magnetic resonance-based wireless power transmission system in accordance with the present disclosure.

As shown in FIG. 2, a transmitter of a magnetic resonance-based wireless power transmission system in accordance with the present disclosure may include a power supply 100 which may be a direct current power. When an alternate current power is used, the alternate current power may be converted to the direct current power.

The transmitter of a magnetic resonance-based wireless power transmission system in accordance with the present disclosure may include a variable drive frequency signal generator 200 which may be configured to receive a drive voltage from the power supply 100 and generate a drive frequency signal for wireless power transmission. The variable drive frequency generator 200 may generate the variable drive frequency signal by varying a drive frequency at a first sweep frequency interval within about ±50% of a resonance frequency determined by an inductance L and capacitance C of an inductor and capacitor included in the wireless power transmission unit of the magnetic resonance-based wireless power transmission system.

For example, the variable drive frequency generator 200 may generate the variable drive frequency signal by varying a drive frequency at a 1 KHz frequency interval within about 50 to 150 KHz when a resonance frequency determined by an inductance L and capacitance C of an inductor and capacitor included in the wireless power transmission unit of the magnetic resonance-based wireless power transmission system is about 100 Khz. Then, the variable drive frequency generator 200 may send the variable drive frequency signal to a switching unit 300.

In one example, the variable drive frequency signal generator 200 may feed directly the variable drive frequency signal to the switching unit 300. However, in general, the switching unit 300 may have components having a tolerance. In order to minimize the tolerance of the components of the switching unit 300, the transmitter of a magnetic resonance-based wireless power transmission system in accordance with the present disclosure may include a duty ratio changing unit 210 configured to vary a duty ratio of the drive frequency signal. Thus, the drive frequency signal with the adjusted duty ratio may be inputted to the switching unit 300.

As for the duty ratio changing unit 210, a duty reference value may be set to about 50%. In this connection, the duty ratio may be adjusted within ±10% of the duty reference value.

The switching unit 300 may be configured to switch and amplify the variable drive frequency signal from the variable drive frequency signal generator 200. The switching unit 300 may be implemented using a half bridge or full bridge circuit.

The wireless power transmission unit 400 may receive the variable drive frequency signal from the switching unit 300 and wirelessly transmit the power to a wireless power receiving unit (not depicted). The wireless power transmission unit 400 may wirelessly transmit the same to a wireless power receiving unit (not depicted) via a LC parallel resonance from a parallel connection of the inductor and capacitor.

A frequency detection unit 500 may detect an amplitude of the variable drive frequency signal outputted from the wireless power transmission unit 400 using an envelope detection, LC ratio detection, Foster-seeley detection, or voltage comparison detection.

Then, a comparator 600 may compare the detected amplitude of the variable drive frequency signal to a reference value as a predetermined amplitude. When the detected amplitude of the variable drive frequency signal is larger than or equal to the reference value as a predetermined amplitude, the frequency or duty ratio may be determined as a drive frequency and duty ratio for transmission from the wireless power transmission unit 400. Then, the frequency or duty ratio may be fed back to the variable drive frequency generator 200 and duty ratio changing unit 210. Thus, the variable drive frequency generator 200 and duty ratio changing unit 210 may generate a drive frequency signal using the fed drive frequency and duty ratio. Then, the generated drive frequency signal may be sent via the switching unit 300 to the wireless power transmission unit 400. In this way, the wireless power transmission unit 400 may wirelessly transmit the power to the wireless power receiving unit using a maximum resonance.

In this connection, the reference value as the predetermined amplitude may be set to a value above a predetermined percentage of a maximum amplitude wherein the maximum amplitude may be an amplitude as measured at an absence of a metal between the wireless power transmission unit 400 and wireless power receiving unit. Generally, the reference value as the predetermined amplitude may be set to an amplitude above 50% of the maximum amplitude.

When plural variable drive frequency signals have amplitudes equal to or larger than the predetermined amplitude as the reference value, the transmission drive frequency and transmission duty ratio may be determined as a drive frequency and duty ratio of an variable drive frequency signal with the largest amplitude among the plural variable drive frequency signals.

Further, although a certain variable drive frequency signal has an amplitude equal to or larger than the predetermined amplitude as the reference value, the transmission drive frequency and transmission duty ratio may be optimized periodically and repeatedly to deal with the change in an environment of the wireless power transmitter.

However, when the detected amplitude of the variable drive frequency signal is smaller than the reference value as a predetermined amplitude, an efficient wireless power transmission may not be achieved. Thus, the variable drive frequency generator 200 should be reset. Then, the variable drive frequency generator 200 may generate a new drive frequency signal by varying a drive frequency at a second sweep frequency interval smaller than the first sweep frequency interval. Further, the variable drive frequency generator 200 may generate a new drive frequency signal by varying a drive frequency at a third sweep frequency interval smaller than the second sweep frequency interval. This process may be repeated until the detected amplitude of the variable drive frequency signal from the wireless power transmission unit 400 is larger than or equal to the reference value as a predetermined amplitude.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A power wireless transmitter in a magnetic resonance-based wireless power transmission system, the transmitter comprising:

a power supply;

a variable drive frequency signal generator configured to receive a drive voltage from the power supply and generate a variable drive frequency signal for wireless power transmission, a drive frequency of the variable drive frequency signal being varied according to a change in a resonance frequency of the transmitter due to presence of a metal;

a switching unit configured to receive the drive voltage from the power supply and to receive the variable drive frequency signal from the variable drive frequency generator and to switch and amplify the variable drive frequency signal;

a wireless power transmission unit configured to receive the amplified variable drive frequency signal from the switching unit and wirelessly transmit a power to a wireless power receiving unit using the amplified variable drive frequency signal;

a frequency detection unit configured to detect an amplitude of the amplified variable drive frequency signal outputted from the wireless power transmission unit;

a comparator configured to compare the detected amplitude of the amplified variable drive frequency signal to a reference value as a predetermined amplitude; and a duty ratio changing unit configured to vary a duty ratio of the variable drive frequency signal generated from the variable drive frequency generator, wherein the variable drive frequency signal with a varied duty ratio is inputted to the switching unit, wherein when the detected amplitude of the amplified variable drive frequency signal is larger than or equal to the reference value as the predetermined amplitude, the frequency of the amplified variable drive frequency signal is determined as a drive frequency for transmission from the wireless power transmission unit, wherein the determined frequency is fed back to the variable drive frequency generator, and, thus, the variable drive frequency generator generates a drive frequency signal using the fed drive frequency, wherein a duty reference value is set to about 50%, and the duty ratio changing unit is configured to vary the duty ratio within ±10% of the duty reference value, wherein when the detected amplitude of the amplified variable drive frequency signal with the varied duty ratio is larger than or equal to the reference value as the predetermined amplitude, the varied duty ratio is determined as a duty ratio for transmission from the wireless power transmission unit, wherein the determined duty ratio is fed back to the duty ratio changing unit, and, thus, the duty ratio changing unit varies a duty ratio of the drive frequency signal using the fed duty ratio, and wherein when plural variable drive frequency signals with different drive frequencies and duty ratios have amplitudes equal to or larger than the predetermined amplitude as the reference value, the drive frequency and duty ratio for transmission from the wireless power transmission unit are determined as a drive frequency and duty ratio of a variable drive frequency signal with the largest amplitude among the plural variable drive frequency signals.

2. The power wireless transmitter of claim 1, wherein the variable drive frequency generator generates the variable drive frequency signal by varying a drive frequency at a first sweep frequency interval within about ±50% of a resonance frequency determined by an inductance and capacitance of an inductor and capacitor included in the wireless power transmission unit.

3. The power wireless transmitter of claim 2, wherein when the detected amplitude of the amplified variable drive frequency signal is smaller than the reference value as a predetermined amplitude, the variable drive frequency generator generates a drive frequency signal by varying the drive frequency at a second sweep frequency interval smaller than the first sweep frequency interval.

4. The power wireless transmitter of claim 1, wherein the switching unit is implemented using a half bridge or full bridge circuit.

5. The power wireless transmitter of claim 1, wherein the wireless power transmission unit wirelessly transmits the power to the wireless power receiving unit via a LC parallel resonance.

6. The power wireless transmitter of claim 1, wherein the frequency detection unit uses an envelope detection, LC ratio detection, Foster-seeley detection, or voltage comparison detection.

* * * * *